(12) United States Patent
Desgardin et al.

(10) Patent No.: US 7,094,487 B2
(45) Date of Patent: Aug. 22, 2006

(54) SOLID COMPOSITION, HYDROGEN GENERATING METHOD, AND PROTON EXCHANGE MEMBRANE FUEL CELL

(75) Inventors: Nancy Desgardin, Arpajon (FR); Christian Perut, St. Fargeau (FR); Joel Renouard, St Martin en Biere (FR)

(73) Assignee: SNPE Materiaux Energetiques, Paris (FR)

( * ) Notice: Subject to any disclaimer, the term of this patent is extended or adjusted under 35 U.S.C. 154(b) by 206 days.

(21) Appl. No.: 10/655,303

(22) Filed: Sep. 5, 2003

(65) Prior Publication Data
US 2004/0065865 A1    Apr. 8, 2004

(30) Foreign Application Priority Data
Oct. 4, 2002    (FR) ................... 02 12312

(51) Int. Cl.
| C01B 7/00 | (2006.01) |
| C01B 3/04 | (2006.01) |
| H01M 8/18 | (2006.01) |
| B01J 7/00 | (2006.01) |
| H01M 8/04 | (2006.01) |

(52) U.S. Cl. ............. 429/19; 48/61; 252/186.36; 423/648.1; 429/17

(58) Field of Classification Search ........... 422/211; 252/188.25, 188.26, 186.36; 423/645, 646, 423/647, 658.2, 648.1; 429/30, 17, 19; 149/22; 48/61

See application file for complete search history.

(56) References Cited

U.S. PATENT DOCUMENTS

| 3,066,009 A | | 11/1962 | Heying |
| 3,069,300 A | * | 12/1962 | Damon et al. ................ 149/22 |
| 3,126,305 A | | 3/1964 | Armstrong |
| 3,577,289 A | * | 5/1971 | Morrell ...................... 149/18 |
| 3,948,699 A | | 4/1976 | Ayers et al. |
| 4,064,225 A | | 12/1977 | Chew et al. |
| 4,341,651 A | | 7/1982 | Beckert et al. |
| 4,468,263 A | | 8/1984 | Artz et al. |

FOREIGN PATENT DOCUMENTS

| DE | 1 150 914 | 6/1963 |
| GB | 948870 | 2/1964 |
| WO | WO 02/18267 A1 | 3/2002 |

OTHER PUBLICATIONS

Aiello R et al: "Production of Hydrogen gas from novel chemical hydrides" International Journal of Hydrogen Energy, vol. 23, No. 12, Dec. 1, 1998, pp. 1103-1108.

* cited by examiner

*Primary Examiner*—Wayne A. Langel
(74) *Attorney, Agent, or Firm*—Oliff & Berridge, PLC

(57) ABSTRACT

The invention relates to a solid composition which can decompose with the generation of hydrogen according to a self-sustaining combustion reaction after initiation of this reaction by an appropriate heat source, this composition being characterized in that it comprises an alkali metal borohydride or alkaline earth metal borohydride and a perchlorate-based oxidizing salt corresponding to the general formula $SClO_4$ in which X represents the $NH_4$ group, an alkali metal or an alkaline earth metal.

11 Claims, 1 Drawing Sheet

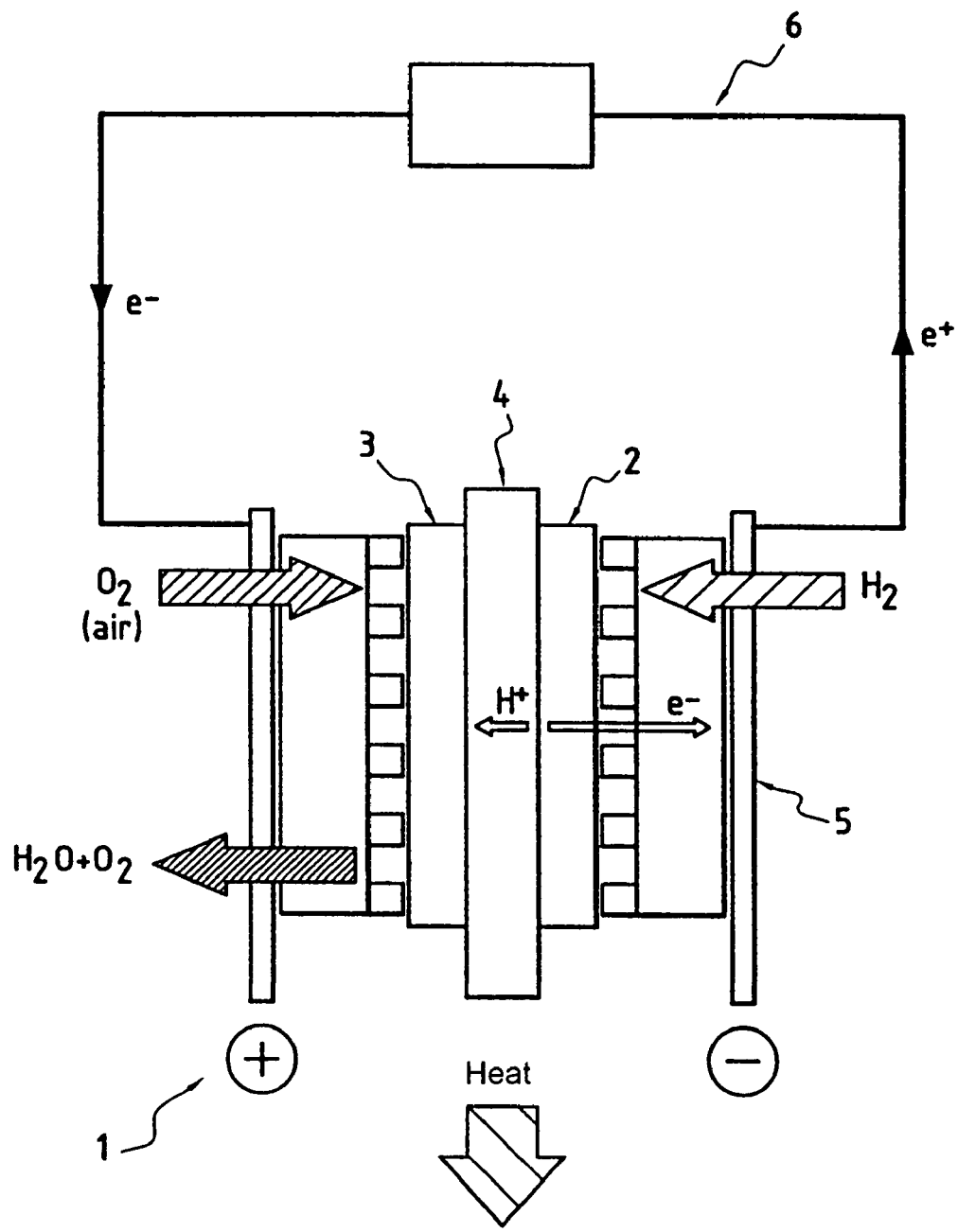

SOLID COMPOSITION, HYDROGEN GENERATING METHOD, AND PROTON EXCHANGE MEMBRANE FUEL CELL

The present invention relates to the field of generators of hydrogen, a gas widely used as fuel or reducing agent in numerous devices or industrial processes.

A more specific subject-matter of the invention is novel solid compositions which can decompose with the generation of hydrogen according to a self-sustaining combustion reaction, and the use of these compositions for supplying hydrogen to proton exchange membrane fuel cells.

BACKGROUND

Numerous solid composition which generate hydrogen by combustion are known, in particular for producing hydrogen intended to act as fuel in chemical lasers.

Patent U.S. Pat. No. 3,948,699 discloses solid compositions which generate hydrogen by combustion composed of a mixture of alkali metal borohydride, for example sodium borohydride $NaBH_4$, with a metal oxide, for example iron oxide $Fe_2O_3$.

However, the yields by mass of hydrogen produced are low, less than 5%, expressed by weight of hydrogen obtained with respect to the total weight of the composition.

Patent U.S. Pat. No. 4,064,225 discloses other solid compositions which generate hydrogen by combustion composed of a mixture of alkali metal borohydride, for example sodium borohydride, with ammonium sulphate $(NH_4)_2SO_4$ or ammonium dichromate $(NH_4)_2Cr_2O_7$.

The yields by mass are slightly higher, of the order of 6%.

Such hydrogen yields, less than or in the vicinity of 5%, prove in practice to be inadequate, in particular when miniaturization of systems is desired, for example when it is desired to replace the batteries of portable electronic systems, such as telephones and computers, with miniature hydrogen fuel cells.

SUMMARY

A person skilled in the art who wishes to replace the batteries of portable electronic systems, such as telephones and computers, with miniature hydrogen fuel cells is therefore continually preoccupied with trying to find novel solid compositions which generate hydrogen by combustion which are completely stable and which provide better yields by mass of hydrogen.

The present invention provides a solution to this problem.

BRIEF DESCRIPTION OF THE DRAWING

The FIGURE represents an electrochemical cell of the core of a fuel cell.

DETAILED DESCRIPTION

A more specific subject-matter of the invention is novel solid compositions which can decompose with the generation of hydrogen according to a self-sustaining combustion reaction after initiation of this reaction by an appropriate heat source, the said composition comprising an alkali metal borohydride or alkaline earth metal borohydride and a perchlorate-based oxidizing salt corresponding to the general formula $XClO_4$ in which X represents the $NH_4$ group, an alkali metal or an alkaline earth metal. It has been found, unexpectedly, that such compositions make it possible to provide a yield by mass of hydrogen of the order of 6% to 14% depending on the nature and the relative proportions of the constituents, which constitutes a particularly advantageous technical and economic advance for the abovementioned reasons.

Sodium perchlorate $NaClO_4$ is particularly preferred among alkali metal perchlorates. The use of potassium perchlorate $KClO_4$ can also be envisaged.

According to a preferred alternative form, the compositions according to the invention are devoid of organic matter.

In a particularly preferred way, they are composed essentially of an alkali metal borohydride or alkaline earth metal borohydride and of the perchlorate-based oxidizing salt of general formula $XClO_4$, that is to say that these constituents are the predominant ones by weight. It will be appreciated that the sum of the contents by weight of alkali metal borohydride or alkaline earth metal borohydride and of perchlorate-based oxidizing salt $XClO_4$ is greater than or equal to 75%, better still greater than or equal to 90% and even greater than or equal to 95%, with respect to the total weight of the composition.

Compositions composed solely of alkali metal borohydride or alkaline earth metal borohydride and of perchlorate-based salt $XClO_4$, that is to say for which the sum of the contents by weight of the two constituents reaches 100% with respect to the total weight of the composition, are particularly preferred. The term "composed solely" should be understood as meaning that the compositions can nevertheless include the impurities present in the crude or purified alkali metal borohydride or alkaline earth metal borohydride and in the crude or purified $XClO_4$ salt used, or alternatively additives, such as stabilizers, whether these products are commercially available or are synthesized according to conventional methods.

When the compositions are not composed solely of alkali metal borohydride or alkaline earth metal borohydride and of the perchlorate-based salt $XClO_4$, they can, for example, also comprise other metal, alkali metal or alkaline earth metal borohydrides and/or a metal hydride and/or other oxidizing inorganic salts, such as alkali metal nitrates, ammonium sulphate, ammonium dichromate and iron oxides.

According to another preferred alternative form of the invention, the alkali metal borohydride is chosen from the group consisting of lithium borohydride, sodium borohydride and their mixtures.

According to another preferred alternative form of the invention, the alkaline earth metal borohydride used can be magnesium borohydride $Mg(BH_4)_2$, which has available a high level of hydrogen.

Generally and preferably, according to the invention, the ratio of content by weight of alkali metal borohydride or alkaline earth metal borohydride to content by weight of perchlorate-based oxidizing salt $XClO_4$ is between 1 and 10, better still between 2 and 10 and preferably between 4 and 10.

One aim of the invention is to obtain hydrogen-generating compositions having a good yield by mass of hydrogen per gram of solid composition and which are combusted at a temperature which is sufficiently high for the reaction to be self sustaining and to prevent the solid composition from being extinguished and thus from being entirely consumed. The relative proportions by weight between the oxidizing agent and the reducing agent should be established so as to achieve this aim.

For example, a composition based on sodium borohydride $NaBH_4$ and on sodium perchlorate $NaClO_4$ in respective relative proportions by weight of 66 and 34 would give a theoretical yield by mass of hydrogen per gram of composition of 7.0 with a combustion temperature of between 820 and 840° K.

Likewise, a composition based on sodium borohydride $NaBH_4$ and on ammonium perchlorate $NH_4ClO_4$ in respective relative proportions by weight of 71 and of 29 would make it possible to obtain a theoretical yield of hydrogen of 8.6 with a combustion temperature also of between 820 and 840° K.

According to another preferred alternative form, the solid compositions according to the invention are provided in the form of a compact material having a specific form, for example and preferably in the form of pellets or grains. The grains can have any shape, preferably spherical, ovoid or cylindrical.

The pellets can also have any thickness and any peripheral geometry, for example circular, elliptical, square or rectangular.

The thickness of the pellets may not be constant.

The solid compositions according to the invention can be obtained by analogy with the described methods used to produce the abovementioned solid compositions of the state of the art, for example by simple mixing of the constituents, milling and then mechanical homogenization. It is also possible to mill the constituents before the mixing or alternatively to use constituents already in pulverulent form.

The compositions can also be obtained by granulation.

When, preferably, it is desired to obtain a solid composition which is provided in the form of a compact material, the granular or pulverulent homogeneous mixture of the various constituents can, for example, be agglomerated by compacting in a pressing container having the shape and the dimensions which are desired for the compact material.

It is also possible to obtain a compact material by dissolving and/or suspending the constituents in a liquid medium. After homogenizing and placing in a mould with the appropriate dimensions desired for the compact material, the liquid is removed, for example by evaporation, which makes it possible to obtain a compact material.

Another subject-matter of the present invention is a process for the generation of hydrogen by self-sustaining combustion of a solid composition comprising an alkali metal borohydride or alkaline earth metal borohydride and a perchlorate-based oxidizing salt of general formula $XClO_4$ in which X is the $NH_4$ group, an alkali metal or an alkaline earth metal.

According to this process, a pulverulent or granular homogeneous solid composition comprising an alkali metal borohydride or alkaline earth metal borohydride and a perchlorate-based oxidizing salt of general formula $XClO_4$, it being possible for X to be the $NH_4$ group, an alkali metal or an alkaline earth metal, is first of all prepared.

This composition is subsequently agglomerated using appropriate means, for example those mentioned above, so as to form a compact material, and then the compact material is placed in a combustion chamber which is purged under an inert gas or placed under vacuum.

When the dead volume (the volume remaining in the chamber after the compact material has been placed therein) is low, such a purge may in practice be unnecessary.

The combustion of the compact material is then initiated using an appropriate heat source, which brings about the self-sustaining combustion of the material with generation of hydrogen up to the end of the combustion.

The appropriate heat sources which make possible the initiation of the combustion by the "Joule" effect are well known to a person skilled in the art, in particular electrical initiators. The use of a nickel-chromium ignition filament placed in contact or coated with the composition to be initiated, on which a sufficient voltage and a sufficient current intensity (and therefore a sufficient power) are imposed, is entirely suitable. It is possible, for example, for a given voltage, to increase the intensity of the current until the combustion is initiated.

In some cases, to promote the ignition, a conventional relay-ignition powder well known to a person skilled in the art can be positioned between the filament and the compact material. In this case, use will preferably be made of a relay-ignition powder of the same nature as the compact material according to the invention, that is to say having the same constituents but with a markedly lower ratio of content by weight of alkali metal borohydride or alkaline earth metal borohydride to content by weight of perchlorate-based oxidizing salt, for example between 0.1 and 1.

Another subject-matter of the present invention is a pyrotechnic hydrogen generator, intended to supply hydrogen to a proton exchange membrane fuel cell, comprising an abovementioned solid composition according to the invention.

Fuel cells operating with hydrogen, also known as proton exchange membrane fuel cells, are well known to a person skilled in the art.

Such a fuel cell is composed essentially of 2 parts:
the core of the fuel cell, composed of one or more electrochemical cells mounted in series, which produces the electrical energy;
the fuel, namely hydrogen, reservoir.

Attached to these two main parts are auxiliary systems relating in particular to supplying hydrogen to the core of the fuel cell, to discharging the water produced or to cooling.

It is observed, in the Figure, that an electrochemical cell 1 of the core of the fuel cell supplies electrical energy from two electrochemical reactions carried out on two electrodes 2 and 3 generally composed of carbon and separated by a proton exchange membrane 4 acting as electrolyte and generally composed of fluoropolymers impregnated with water. Hydrogen $H_2$ is oxidized on the anode 2 in the presence of a generally platinum-based catalyst, the hydrogen being separated into protons $H^+$ and electrons $e^-$. The stream of protons $H^+$ passes through the membrane 4, while the electrons $e^-$, which are not able to pass through the membrane 4, are captured by a current collector 5 connected to an external electrical circuit 6 to rejoin the cathode 3. On the other side of the membrane 4, at the cathode 3, the protons $H^+$ and the electrons e recombine with oxygen $O_2$, generally originating from the surrounding air, to produce water $H_2O$.

The pyrotechnic hydrogen generators according to the invention are essentially composed of one or more chambers in which a solid composition according to the invention, separate means for initiating the combustion of the composition in each of the chambers, means for actuating this initiation and means for transferring the hydrogen released in the chambers to the anode of a cell of the core of the fuel cell are placed.

Preferably, the overall amount of hydrogen capable of being supplied by the generator is released discontinuously by a separate initiation of the solid compositions present in the various chambers. The mass of solid composition in each chamber can be identical or different from one chamber to another. The last alternative form makes possible release of hydrogen in an amount suited to a specific need.

The various chambers can emerge in a chamber for the expansion of the hydrogen released, this chamber being connected to the anode compartment of a cell or having one of its walls at least partially formed by the anode.

Another subject-matter of the present invention is a proton exchange membrane fuel cell using hydrogen as fuel, comprising at least one electrochemical cell and one abovementioned pyrotechnic hydrogen generator according to the invention connected to the anode compartment of the cell.

The following nonlimiting examples illustrate the invention and the advantages which it provides.

EXAMPLES

Example 1

Solid Composition Composed of a Mixture of $NaBH_4$ and of $NaClO_4$ in the Relative Proportions by Weight 60/40 Respectively A mixture of 90 g of $NaBH_4$ and 60 g of $NaClO_4$ is milled and then homogenized.

A fraction of the pulverulent and homogeneous mixture thus obtained is subsequently introduced into and then compacted in the compression die of a pelletizer having the desired pellet geometry, under a pressure of $10^7$ Pa (100 bar).

The circular pellet thus obtained, with a diameter of 5 mm and a mass of 80 mg, is subsequently introduced into a combustion chamber with a volume of 10 cm$^3$ and equipped with a pressure gauge, a temperature probe and a conventional ignition device comprising a nickel (80 weight %)-chromium (20 weight %) filament. The pellet is brought into contact with the filament and then the chamber is purged with an inert gas (nitrogen) under an absolute pressure of $10^5$ Pa (1 bar).

The filament is subsequently heated by the Joule effect until initiation of the combustion.

Once initiated, the combustion of the composition is self-sustaining and lasts approximately 3 s.

The calculated theoretical combustion temperature is 964° K.

On completion of the combustion, the chamber is allowed to cool to ambient temperature and then the pressure in the chamber is recorded.

The measured increase in pressure and the analysis of the gases present after combustion by chromatography coupled to a mass spectrometer makes it possible to calculate a yield by mass of hydrogen, expressed as grams of hydrogen released per gram of solid composition. This yield can be calculated as a function of the abovementioned data. Under these conditions, this hydrogen yield will be 6.39%.

DTA analyses were carried out on this composition formed of 60/40 sodium borohydride $NaBH_4$ and $NaClO_4$ to determine whether it was stable.

DTA (Differential Thermal Analysis) is a calorimetric measurement test. It consists in heating the composition from 15 to 200° C., the temperature being increased by 8° C. per minute. During this rise in temperature, this test consists in plotting the temperatures of the endothermic or exothermic peaks and in measuring the energy released or absorbed. If no energy is released or absorbed, this means that the composition is stable and thus that the constituents of the composition analysed are entirely compatible.

The tests carried out on the composition of Example 1, 60/40 $NaBH_4/NaClO_4$, show that this composition is stable. This is because, during the DTA test, no energy was released or absorbed during the rise in temperature.

Examples 2 to 7 are carried out in exactly the same way, only the relative proportions by weight between the two constituents being modified. The yield by mass of hydrogen and the combustion temperature which are theoretically obtained by calculations in each of the examples are shown in Table 1 below.

TABLE 1

|  | $NaBH_4/NaClO_4$ ratio by mass | Combustion temperature (° K) | Yield of hydrogen (%) |
|---|---|---|---|
| Example 2 | 70/30 | 536 | 7.46 |
| Example 3 | 50/50 | 1 337 | 5.33 |
| Example 4 | 40/60 | 2 016 | 4.12 |
| Example 5 | 30/70 | 2 654 | 1.57 |
| Example 6 | 20/80 | 2 617 | 0.06 |
| Example 7 | 10/90 | 1 543 | 0 |

The theoretical yield of hydrogen decreases, of course, when the proportion of hydrogen-carrying reducing agent decreases.

Examples 8 to 10

Solid Compositions Composed of a Mixture of $NaBH_4$ and $NH_4ClO_4$ in Different Relative Proportions by Weight.

In this example, sodium perchlorate $NaClO_4$ is replaced by ammonium perchlorate $NH_4ClO_4$. The preparation is carried out in exactly the same way as in Example 1 above, that is to say with the production of a pellet with the same mass, but varying the relative proportions by weight between the two constituents.

The results obtained theoretically by calculations are displayed in Table 2 below:

TABLE 2

|  | $NaBH_4/NH_4ClO_4$ ratio by mass | Combustion temperature (° K) | Yield of hydrogen (%) |
|---|---|---|---|
| Example 8 | 75/25 | 526 | 8.85 |
| Example 9 | 70/30 | 879 | 8.49 |
| Example 10 | 60/40 | 1 183 | 7.76 |

Examples 11 to 17

In these examples, $NaBH_4$ is replaced by $LiBH_4$, and $NH_4ClO_4$ is used as oxidizing agent. The preparation is carried out in the same way as in the preceding examples with different relative proportions by weight between the two constituents.

The theoretical results obtained by calculations are displayed in Table 3 below.

TABLE 3

|  | $LiBH_4/NH_4ClO_4$ ratio by mass | Combustion temperature (° K) | Yield of hydrogen (%) |
|---|---|---|---|
| Example 11 | 70/30 | 760 | 13.1 |
| Example 12 | 60/40 | 1 214 | 12.50 |
| Example 13 | 50/50 | 1 423 | 11.00 |
| Example 14 | 40/60 | 1 574 | 9.44 |
| Example 15 | 30/70 | 1 960 | 7.58 |
| Example 16 | 20/80 | 2 548 | 3.87 |
| Example 17 | 10/90 | 2 775 | 0.48 |

Examples 18 to 22

Solid Compositions Composed of a Mixture of $Mg(BH_4)_2$ and $NaClO_4$ in Different Relative Proportions by Weight In these examples, the alkali metal borohydride $NaBH_4$ is replaced by an alkaline earth metal borohydride, magnesium borohydride $Mg(BH_4)_2$. The oxidizing salt used in these compositions is sodium perchlorate $NaClO_4$.

In these examples, the preparation is carried out in exactly the same way as in the preceding examples with pellets of the same mass comprising the two constituents in different relative proportions. The yield by mass of hydrogen and the combustion temperature, which are obtained theoretically, are shown in Table 4 below for each of the examples.

TABLE 4

|  | $Mg(BH_4)_2/NaClO_4$ ratio by mass | Combustion temperature (° K) | Yield of hydrogen (%) |
| --- | --- | --- | --- |
| Example 18 | 80/20 | 856 | 12 |
| Example 19 | 70/30 | 1 356 | 10.5 |
| Example 20 | 60/40 | 1 839 | 8.8 |
| Example 21 | 50/50 | 1 933 | 7.1 |
| Example 22 | 40/60 | 1 996 | 5.5 |

Examples 23 to 27

Solid Compositions Composed of Mixtures of $Mg(BH_4)_2$ and $NH_4ClO_4$ in Different Proportions by Weight In these examples, in comparison with the preceding Examples 18 to 22, sodium perchlorate $NaClO_4$ is replaced by ammonium perchlorate $NH_4ClO_4$.

The preparation is carried out, for these examples, in strictly the same way as according to the preceding examples, with the different constituents.

The $Mg(BH_4)_2/NH_4ClO_4$ proportions by weight in the composition, the combustion temperature and the yield by mass of hydrogen, which are obtained theoretically, are specified in the following Table 5 for each example.

TABLE 5

|  | $Mg(BH_4)_2/NH_4ClO_4$ ratio by mass | Combustion temperature (° K) | Yield of hydrogen (%) |
| --- | --- | --- | --- |
| Example 23 | 80/20 | 987 | 13 |
| Example 24 | 70/30 | 1 707 | 12 |
| Example 25 | 60/40 | 1 904 | 9.93 |
| Example 26 | 50/50 | 1 972 | 8.52 |
| Example 27 | 40/60 | 2 102 | 7.3 |

The invention claimed is:

1. Solid composition which can decompose with the generation of hydrogen according to a self-sustaining combustion reaction after initiation of this reaction by an appropriate heat source, characterized in that the said composition consists of an alkali metal borohydride or alkaline earth metal borohydride and a perchlorate-based oxidizing salt corresponding to the general formula $XClO_4$ in which X represents the $NH_4$ group, an alkali metal or an alkaline earth metal.

2. Solid composition according to claim 1, characterized in that X represents sodium or potassium.

3. Solid composition according to claim 1, characterized in that it is provided in the form of a compact material.

4. Solid composition according to claim 3, characterized in that the compact material is a pellet or a grain.

5. Solid composition according to claim 1, characterized in that the alkali metal borohydride is chosen from the group consisting of lithium borohydride, sodium borohydride and their mixtures.

6. Solid composition according to claim 1, characterized in that the alkaline earth metal borohydride is magnesium borohydride.

7. Solid composition according to claim 1, characterized in that the ratio of content by weight of alkali metal borohydride or alkaline earth metal borohydride to content by weight of oxidizing salt $XClO_4$ is between 1 and 10.

8. Process for the generation of hydrogen by self-sustaining combustion of a solid composition comprising:
preparing a pulverulent or granular homogeneous solid composition consisting of an alkali metal borohydride or alkaline earth metal borohydride and a perchlorate-based oxidizing salt of general formula $XClO_4$ in which X represents an $NH_4$ group, an alkali metal or an alkaline earth metal, agglomerating the solid composition to form a compact material,
placing the compact material in a combustion chamber,
initiating a self-sustaining combustion of the compact material with a heat source in the combustion chamber, and
generating hydrogen from the self-sustaining combustion of the compact material in the combustion chamber.

9. Hydrogen generator intended to supply hydrogen to a proton exchange membrane fuel cell, characterized in that this generator is a pyrotechnic generator comprising a solid composition according to claim 1.

10. Proton exchange membrane fuel cell using hydrogen as fuel, comprising at least one electrochemical cell (1) and one hydrogen generator connected to the anode compartment of the cell (1), characterized in that this hydrogen generator is a pyrotechnic generator according to claim 9.

11. Solid composition which can decompose with the generation of hydrogen according to a self-sustaining combustion reaction after initiation of this reaction by an appropriate heat source, characterized in that the said composition consists of an alkali metal borohydride or alkaline earth metal borohydride, a perchlorate-based oxidizing salt corresponding to the general formula $XClO_4$ in which X represents the $NH_4$ group, an alkali metal or an alkaline earth metal, and a stabilizer.

* * * * *